United States Patent
Booth et al.

(10) Patent No.: US 9,251,368 B2
(45) Date of Patent: Feb. 2, 2016

(54) PROVISIONING TRANSIENT-CONTROLLED SECURE ENVIRONMENTS FOR VIEWING SENSITIVE DATA

(71) Applicant: International Business Machines Corporation, Amronk, NY (US)

(72) Inventors: Alan Edward Booth, Cary, NC (US); Richard Gerald Bowers, Raleigh, NC (US); James Edward Fox, Apex, NC (US); Daniel Edward House, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 14/150,021

(22) Filed: Jan. 8, 2014

(65) Prior Publication Data

US 2015/0193637 A1    Jul. 9, 2015

(51) Int. Cl.
*G06F 17/30* (2006.01)
*G06F 21/62* (2013.01)
*H04L 29/06* (2006.01)
*G06F 9/455* (2006.01)

(52) U.S. Cl.
CPC ........ *G06F 21/6245* (2013.01); *G06F 9/45533* (2013.01); *H04L 63/0428* (2013.01)

(58) Field of Classification Search
CPC ... G06F 21/335; G06F 21/30; G06F 21/6245; G06F 21/64; G06F 21/78; G06F 21/60; G06F 21/62; G06F 9/45533; H04L 63/10; H04L 63/0428

USPC .............. 713/164–167, 189, 193; 726/16–18, 726/26–30
See application file for complete search history.

(56) References Cited

U.S. PATENT DOCUMENTS

| | | | |
|---|---|---|---|
| 7,290,288 B2 * | 10/2007 | Gregg et al. | 726/28 |
| 7,380,120 B1 * | 5/2008 | Garcia | 713/160 |
| 7,810,133 B2 * | 10/2010 | Carter et al. | 726/2 |
| 8,601,498 B2 * | 12/2013 | Laurich et al. | 719/326 |
| 8,654,971 B2 * | 2/2014 | Orsini et al. | 380/33 |
| 2009/0307783 A1 | 12/2009 | Maeda et al. | |
| 2012/0102465 A1 | 4/2012 | Bates et al. | |

* cited by examiner

*Primary Examiner* — Hosuk Song
(74) *Attorney, Agent, or Firm* — Steven Chiu; David H. Judson

(57) ABSTRACT

A new approach to customer support that protects working artifacts through their entire lifecycle by provisioning, on-demand, a transient-controlled debugging environment that preferably is associated with a particular support issue (or subset of issues) when particular artifacts (e.g., files) are securely received at the service or software provider. This approach allows for complete (or substantially complete) isolation and control of the artifacts in a contained environment for so long as necessary by the provider. Preferably, the provider owns or otherwise manages the provisioned environment, which can be augmented as needed to meet the debugging requirements of the particular issue. Preferably, the provisioned environment is restricted in access to only those engineers or others with a verifiable need to know, or that have the necessary training and skill sets for the support operation required.

22 Claims, 4 Drawing Sheets

PROVISIONING TRANSIENT-CONTROLLED SECURE ENVIRONMENTS FOR VIEWING SENSITIVE DATA

BACKGROUND OF THE INVENTION

1. Technical Field

This disclosure relates generally to network-based support activities.

2. Background of the Related Art

In the course of providing customer support for software products (e.g., debugging, or maintaining critical infrastructure), customers must often must send artifacts to service or software providers. In situations where the infrastructure may contain regulated data, e.g., HIPAA, tight controls must exist to ensure that the information is not disseminated beyond fully-qualified and trained support engineers. The working artifacts thus must be protected in transit, while in review, and in use, until such time as it can be assured that they are destroyed. Since the Health Information Technology for Economic and Clinical Health Act (HITECH) was enacted in 2009, industry has struggled to maintain compliance. There are many industry-standard methods for the secure transit of files, but these methods only protect the working artifacts while in transit, and they provide no protection once the artifacts arrive in the service provider's environment. To address this problem, many companies opt to create virtual private networks (VPNs) to allow the service provider to work within the customer's environment, but this solution opens up that environment to potential compromise, and it does not prevent unintended disclosure or exposure to only required artifacts. The problem is further exacerbated if the customer requires that all work be done on the customer's own assets, which may not include the full suite of debugging tools often required by support engineers. As a stop-gap solution, support engineers often go on-site to the customer environment to debug issues, but this is an expensive, non-scalable solution.

BRIEF SUMMARY

This disclosure describes a new approach to customer support that protects working artifacts through their entire lifecycle by provisioning, on-demand, a transient-controlled debugging environment that preferably is associated with a particular support issue (or subset of issues) when particular artifacts (e.g., files) are securely received at the service or software provider. This approach allows for complete (or substantially complete) isolation and control of the artifacts in a contained environment for so long as necessary by the provider. Preferably, the provider owns or otherwise manages the provisioned environment, which can be augmented as needed to meet the debugging requirements of the particular issue. Preferably, the provisioned environment is restricted in access to only those engineers or others with a verifiable need to know, and/or that have the necessary training and skill sets for the support operation required.

In an embodiment, customer files are received securely (e.g., encrypted) at a support center associated with the service provider. Upon receipt, the files are processed (e.g., sorted) to identify the files that need to be analyzed to address a support issue. This subset of files is then associated with a problem management record (PMR). A transient (temporally-restricted) debugging environment uniquely associated with that PMR is then created on-demand. The files are then pushed into the transient debugging environment where they are decrypted. Access to the environment is limited to only those individuals who have been verified to have a need to access the environment to facilitate attempted resolution of the support issue. A permitted individual (e.g., a support analyst) can only work on the files within the transient debugging environment and until such time as the support work is complete. Preferably, all access is via an encrypted session between the analyst's workstation and the environment, with all activities within the environment logged. The analyst is restricted from removing data from the debugging environment including, without limitation, copying or pasting data to the base operating system of the analyst's machine, performing any file transfers out of the environment, or the like. Once the support work is complete (the PMR is closed), the debugging environment (including, without limitation, any virtual machine (VM) created to support the environment) and the customer's data are discarded or destroyed.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 illustrates a high level process flow of this disclosure for instantiating a transient-controlled debugging environment.

DETAILED DESCRIPTION OF AN ILLUSTRATIVE EMBODIMENT

Figure 1:
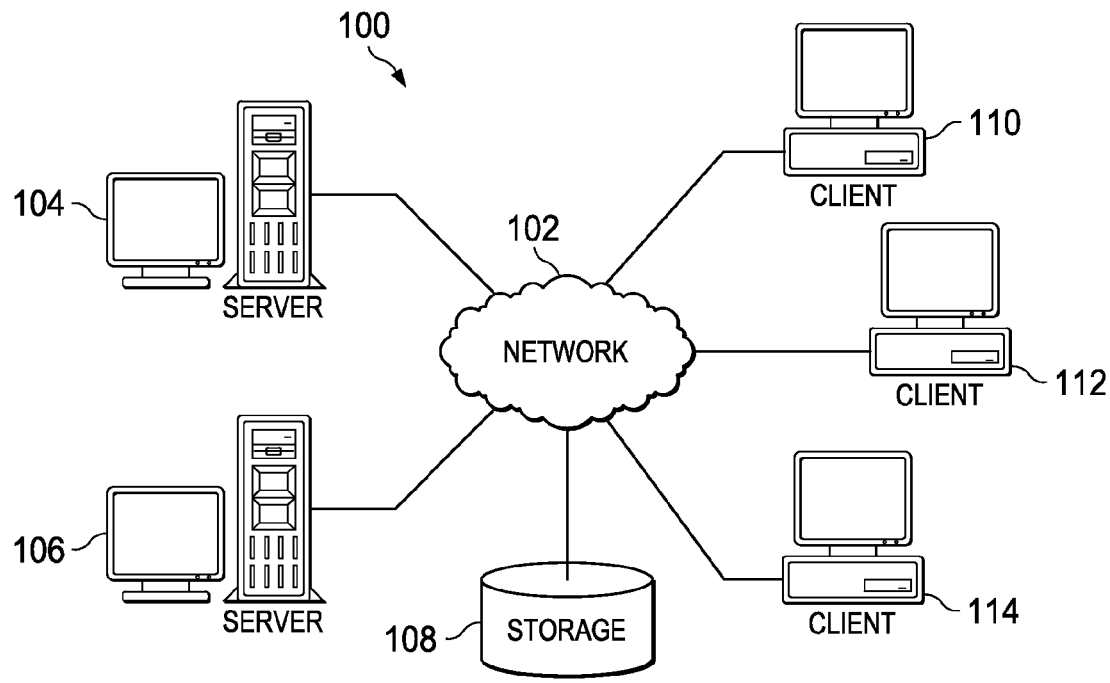
FIG. 1 depicts an exemplary block diagram of a distributed data processing environment in which exemplary aspects of the illustrative embodiments may be implemented.
Figure 2:
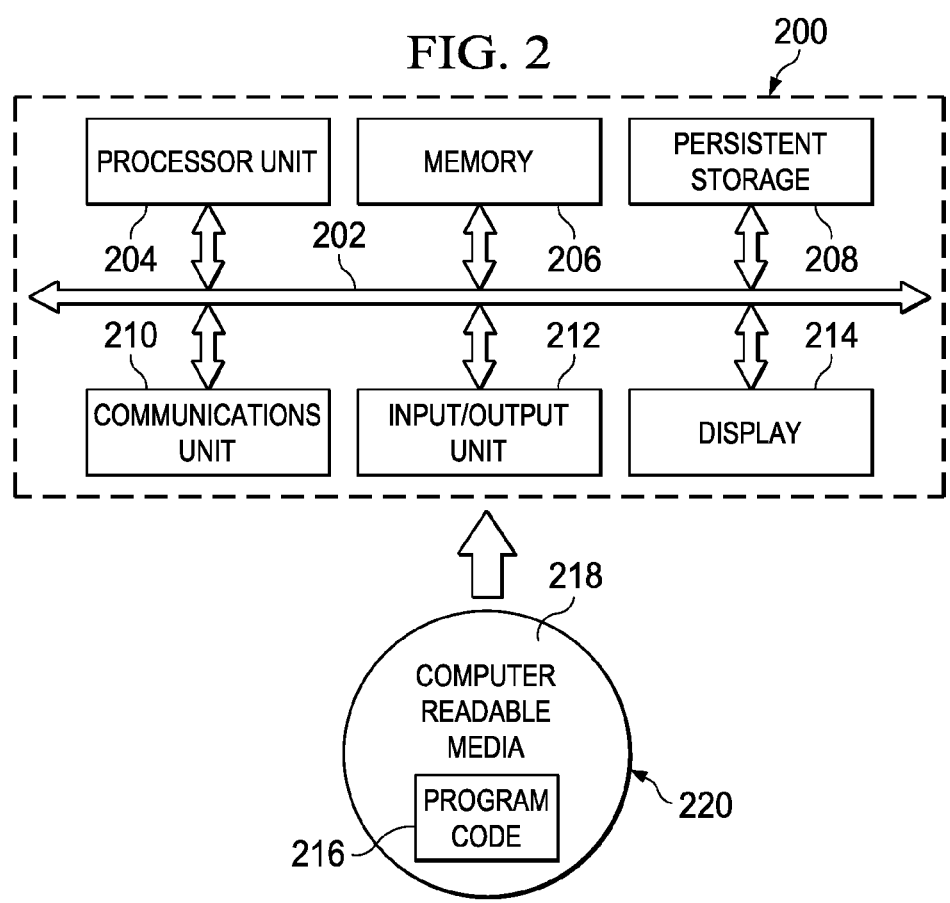
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data.

Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. In such an approach, end users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In the alternative, the techniques described herein may operate within a standalone data processing system, or within the context of a "cloud" environment wherein computing resources are shared among a number of entities.

Integrated Development Environments

Figure 3:
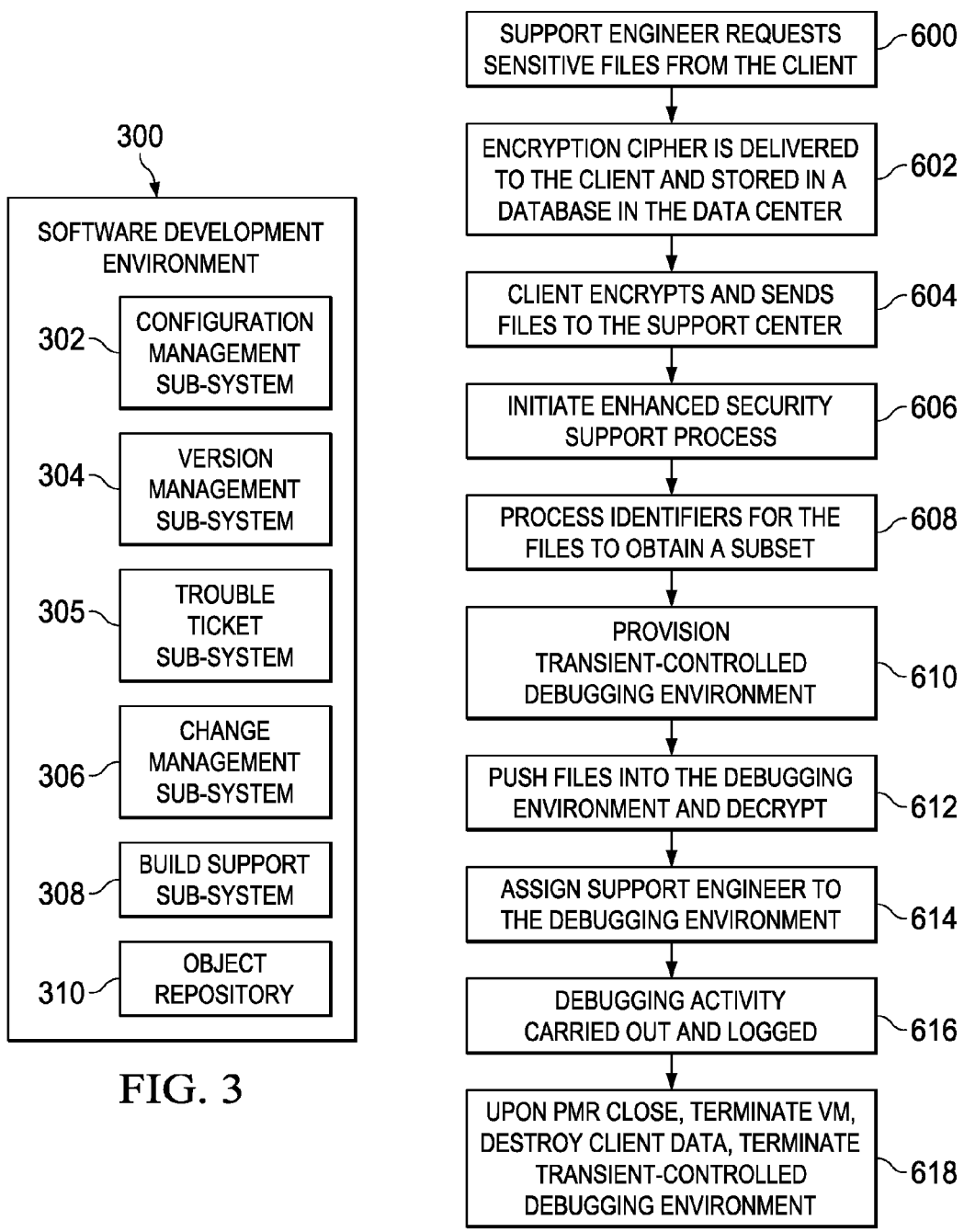
FIG. 3 illustrates a known software development environment in which the subject matter of this disclosure may be implemented or associated.

In one embodiment, the customer support techniques of this disclosure may be implemented within the context of an Integrated Development Environment (IDE), although this is not a limitation. With reference to FIG. 3, a typical software development environment 300 may include a number of logical or functional components or component systems: a configuration management sub-system 302, a version management sub-system 304, a trouble ticket sub-system 305, a change management sub-system 306, and a build sub-system 308. An object repository 310 is provided to store source code, typically in the form of full source code version(s), code snippets, and other code artifacts. One or more of these components may be implemented in a data processing system such as shown in FIG. 2. One or more of these components may be located in proximity to one another or remotely from one another. While the components are shown separately, this is not a limitation, as one or more of these components may be integrated with one another or use shared programs and data. A particular sub-system may be implemented using client-server architecture, such as shown in FIG. 1. The environment 300 may include other machines, applications, servers, databases, user interfaces, programmatic interfaces, utilities and tools. These sub-systems, together with their associated interfaces, tools, databases and the like, enable one or more development and support teams to develop and maintain software programs, typically multi-tier, multi-language applications that are designed to execute on a cross-platform basis. Although not meant to be limiting, a representative software development environment, which is available as open source, is Eclipse, which comprises an integrated development environment (IDE) and an extensible plug-in system. This environment can be used to develop programs in various languages including Java, Ada, C, C++, COBOL, Perl, PHP, Python, and others. A commercial alternative is IBM® Rational® Software Architect, which is an application design and development tool. This provides a comprehensive modeling and development environment that uses the Unified Modeling Language (UML) for designing architecture for C++ and Java 2 Enterprise Edition (J2EE) applications and web services. This system is built on the Eclipse open source software framework and includes capabilities for architectural code analysis, C++, and model-driven development (MDD) with the UML for creating resilient applications and web services. The object repository may store development data including reusable parts, such as JavaBeans and ActiveX, source code such as C++, COBOL and Java, web applets, HTML documents, end user documentation, test cases, and modeled objects.

Typically, the development environment includes tools and mechanisms to enable developers to access code artifacts, to "check-out" an artifact, to make changes to the source code, to "check-in" the modified artifact, to mediate changes made to the artifact by multiple developers operating on different teams, to interface with change control and version control components for tracking and other administrative purposes, and so forth.

When a defect is reported from a customer, it is typically escalated to a support engineer for assistance. In the usual case, the defect is noted as a consequence of receiving a customer problem management record (PMR), or its equivalent, in a bug tracking (or other trouble ticketing) system. Generalizing, a record of this type is sometimes referred to as a "ticket" or "trouble ticket." Using existing IDE tools or the like, the support engineer (or a developer who has received a referral from an engineer, or the like) evaluates that issue. Once the issue is addressed, the ticket (e.g., PMR) is closed.

To diagnose or identify a problem, it is sometimes necessary to provide technical support personnel with data and information (collectively "artifacts") from a customer's system. In addition, technical support personnel might also need to provide the customer with tools or utilities to be used in problem determination. Thus, typically diagnostic information is submitted to the support environment so that problem determination can begin for a Problem Management Record. In one known approach, IBM® Enhanced Customer Data Repository (ECuRep), provides a secure and fully-supported data repository with problem determination tools and functions. It updates problem management records (PMR) and maintains full data lifecycle management. In a typical implementation, ECuRep is an FTP server used to exchange data between support center personnel and customers. The system automatically updates a Problem Management Record (PMR) and notifies a support representative when the customer posts a file. In addition to using FTP, customers can send in files by e-mail through the ECuRep mail gateway or web site. With ECuRep (and similar customer data repositories), service provider employees typically must have a management-approved need to be granted access. This facilitates PMRs that span products, technologies and teams, and it allows multiple people to work the same PMR and see the work that has already been done by others. In a typical ECuRep interaction, customer (client) data is encrypted and sent to the repository. Encrypted data is decrypted and stored in the repository. The support analyst is provided approval to access the repository; typically, every transaction requires the user to log-in using appropriate credentials, and all accesses are logged. Once the PMR is closed, preferably the customer data is destroyed.

Cloud-Based Support Environment

Figure 4:
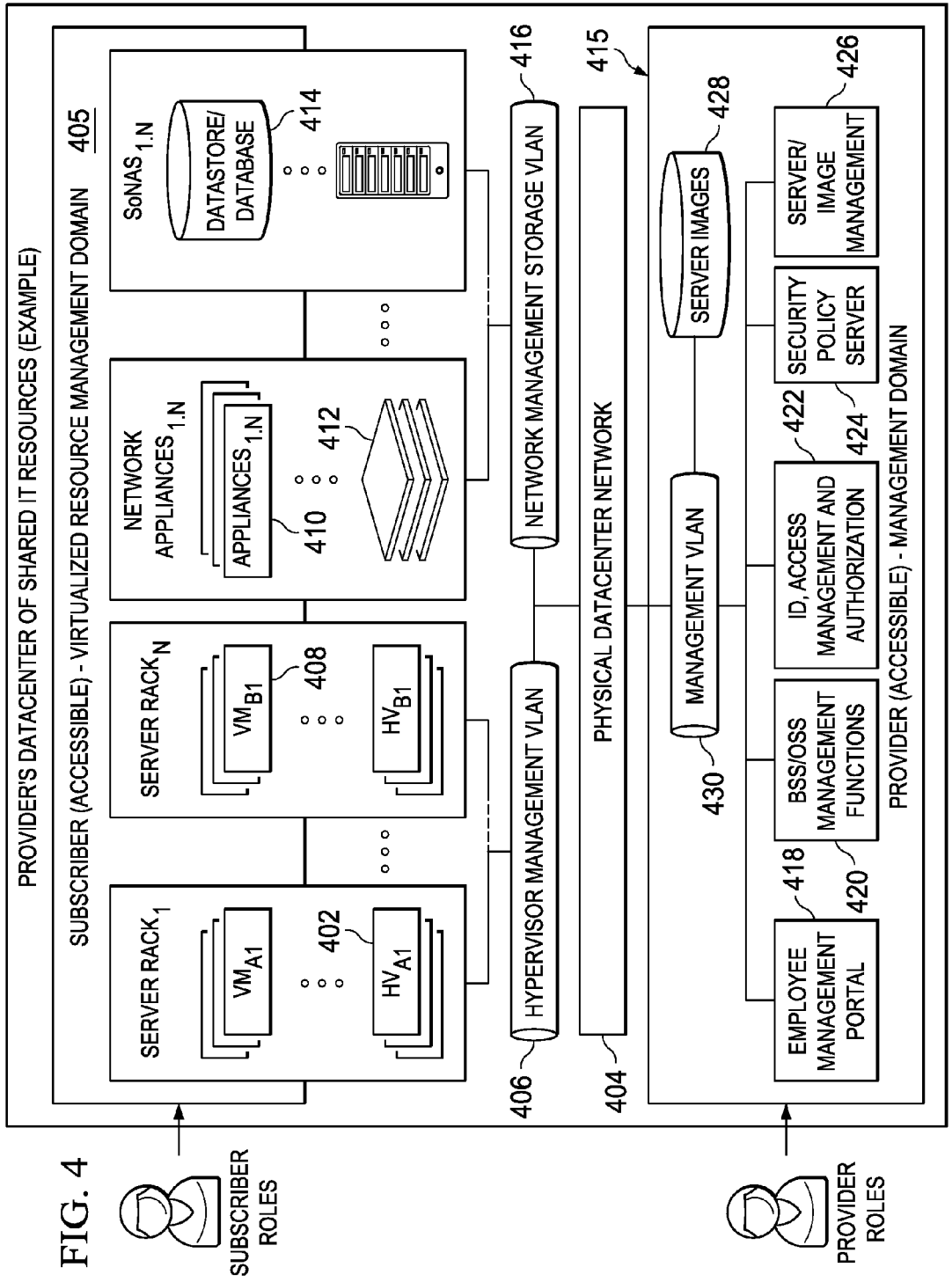
FIG. 4 illustrates an exemplary datacenter in which the transient-controlled debugging environment may be instantiated by a service provider.

The service or software provider may implement a data repository or otherwise provide support activities in the context of a cloud environment. FIG. 4 illustrates a representative environment of this type.

As is well-known, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include several different service models, as well as several deployment models.

The service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may be on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

FIG. 4 illustrates a typical IT infrastructure that supports virtualization of resources. This type of infrastructure may be used as a technical support center for a service or software provider that provisions transient-control debugging environments as will be described below.

For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

The techniques described below are not limited for use with a particular enterprise application deployed within the cloud environment.

Transient-Controlled Debugging Environment

As described generally above, the techniques herein provide for a new approach to customer support. This approach protects working artifacts through their entire lifecycle by provisioning, on-demand, a "transient-controlled debugging environment" that is associated with a particular support issue (or subset of issues) when particular artifacts (e.g., files) are securely received at the service or software provider.

As used herein, the term "transient" refers to a temporal limitation on the debugging environment and, preferably, that the environment is only instantiated for as long as it is needed (and no longer). Typically, the time period over which the debugging environment is instantiated (and thus existing) is tied to the PMR. Thus, when a particular PMR is opened (or re-opened) and the files associated therewith are received, the debugging environment is instantiated, and when the particular PMR for which the environment was instantiated is closed, the environment is terminated. The environment thus "lives" for a transient amount of time.

The environment is "controlled" through various mechanisms, policies and practices. Preferably, the service provider, but no other entity, instantiates and owns a debugging environment. Further, preferably individuals who are permitted access to the environment must have a need to access the environment. Further, information within the environment must remain in the environment and not be copied to or otherwise transferred to external resources. A further aspect of this control is that, once the PMR is closed, the environment itself, as well as preferably all data within it, are discarded or destroyed.

This approach allows for complete (or substantially complete) isolation and control of the artifacts in a contained environment for so long as necessary by the provider. Preferably, the provider owns or otherwise manages the provisioned environment, which can be augmented as needed to meet the debugging requirements of the particular issue. FIG. 4 illustrates a representative physical infrastructure in which transient-controlled debugging environments are instantiated, used, and then destroyed. Preferably, the provisioned environment is restricted in access to only those engineers or others with a verifiable need to know, and/or that have the necessary training and skill sets for the support operation required.

Preferably, a transient-controlled debugging environment is dedicated to a single problem issue, typically as represented by a PMR. Thus, it is anticipated that there will be numerous concurrent debugging environments instantiated and executing within a support center. In one embodiment, a transient-controlled debugging environment is instantiated in its own virtual machine (VM) environment, although this is not a requirement. In particular, a particular VM may be uniquely associated with the PMR for which the transient-controlled debugging environment is created and then used solely for that environment (as least for the time period during which the environment is living). In an alternative embodiment, VMs are associated using other criteria; for example, a particular VM may be associated with just a particular analyst or engineer, or just a particular client, or just a particular regulatory control type (e.g., HIPAA, PCI, ITAR or other).

Figure 5:
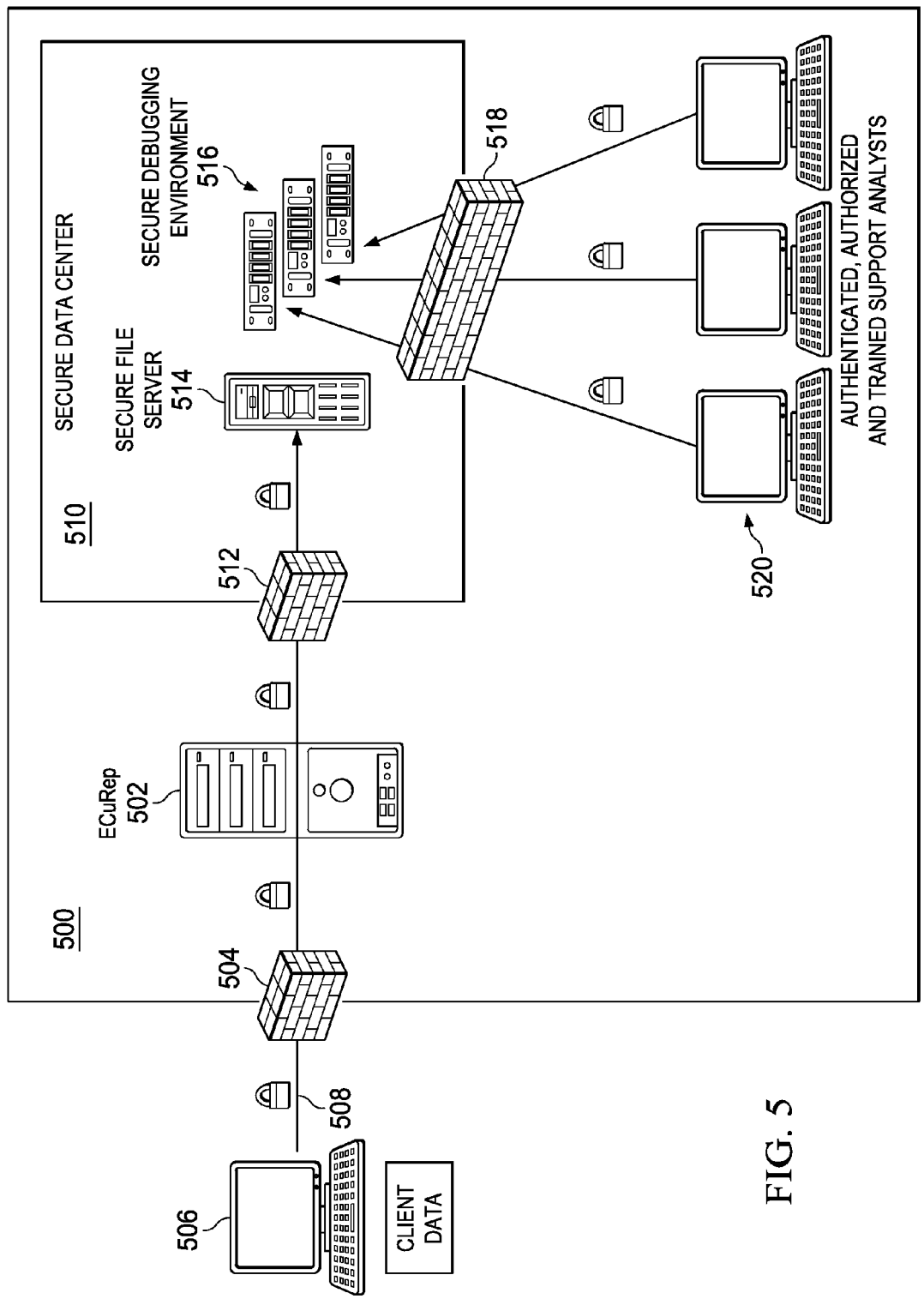
FIG. 5 illustrates a secure data center in which transient-controlled debugging environments are instantiated on-demand according to this disclosure.

FIG. 5 illustrates the support center in a representative but non-limiting embodiment. In this example, the support center 500 has a data repository (such as IBM ECuRep) 502 that is accessed via a firewall 504. The data repository 502 may be accessed through other mechanisms, such as FTP, HTTP, SDDUU, PDUU, e-mail, web sites, and the like. A client machine 506 executes remote support software by which it can access the support center 500. The support software enables the client machine user to perform various functions, such as open a support ticket, upload diagnostic data, and so forth, all in a known manner. The support software may be a dedicated client, or it may be a plug-in to a web browser, a mobile app, or the like. According to this disclosure, that software is extended to enable the user to request initiation of a secure support session using the approach of this disclosure. Typically, the client decides when it needs to exchange data with the support center in a secure support session that will use a transient-controlled debugging environment. Diagnostic information and data is provided by the client 506 over a secure link 508, which may be SSL-based, a VPN, or the like. Client data typically is encrypted by the client prior to transmission (typically using RFC 4880-compliant encryption such as PGP, GnuPGP, or the like). Preferably, the cipher used for this encryption is machine-generated and transmitted to the client machine automatically. When symmetric encryption is used, this cipher is securely stored and only accessible programmatically by code executing on a virtual machine that will be associated with a PMR for the transient-controlled debugging environment.

As also seen in FIG. 5, the support center 500 also includes a secure data center 510 that itself is located (logically, if not physically) within the support center 500. The secure data center 510 is only accessible through an internal firewall 512, and it includes a secure file server 514, and the transient-controlled debugging environment(s) 516. Support analyst workstations 518 access the secure data center 510 through a firewall 518. Preferably, and for each PMR, a secure debugging environment 516 is provisioned, and a particular virtual machine is uniquely associated with (and is used to support) that debugging environment 516. Client data can only be accessed by the VM assigned for the specific PMR, and each VM can only be accessed via encrypted session via the firewall 518 and then only by a security analyst with a need to access the particular environment. A security analyst accesses a particular debugging environment 516 using a workstation 520 (a desktop, laptop, mobile device, etc.). Security and access controls are provisioned to ensure only permitted access to a particular debugging environment by a particular workstation 520. The client data is only enabled to be decrypted within the secure data center 510 and, in particular, within a particular debugging environment 516 therein. The support analyst has no ability to remove data from the debugging environment, due to the firewall 518 and other VNC (virtual network client)-based programmatic controls. These controls, for example, ensure that a system analyst cannot copy and paste data into the workstation 520, or other transfer data external to the debug environment 516. Thus, sensitive customer data is not permitted to leave the debugging environment, let alone the secure data center 510.

As noted above, preferably virtual machines (see, e.g., FIG. 4) that support the debugging environments are rapidly provisioned and include security features. A particular VM (or set of cooperating VMs) are scoped to a particular PMR, and client data is only decrypted within the secure debugging environment, preferably using the cipher securely stored and only accessible programmatically by code executing on the VM associated with the particular PMR. After the PMR is closed, the VM (or VMs) are discarded, along with the customer data. Preferably, each VM used for a debugging environment 516 has a login routine (which may be customized for the particular VM, for a particular client, for a particular regulation type, etc.) and appropriate logging mechanisms such that all activity is logged and traceable to a permitted analyst. As noted above, all analyst access is via encrypted session and logged, and all activities must take place (if at all) within the debugging environment within the secure data center.

FIG. 6 illustrates a process flow of a representative embodiment in which a transient-controlled debugging environment is created and used to facilitate a debugging operation. The process begins at step 600 when a support engineer requests sensitive files from the client. At step 602, an encryption cipher is programmatically delivered to the client and stored in a database in the secure data center. Step 602 may be omitted if a cipher was provided in a prior file transfer operation. At step 604, the client sends the encrypted files to the support center. Files may be pushed to the support center, or pulled by the support center (e.g., using Rysnc, or some other file transport mechanism). At step 606, and when transfer is complete, an enhanced security support process is initiated. This process may be carried out by the secure file server shown in FIG. 5, or in other components or sub-systems. In particular, at step 608, identifiers for the files (which preferably remain encrypted) are processed (e.g., sorted), possibly by problem ticket or other identifier (depending on implementation). The result of step 608 may be a subset of the files, or the original set of information and data received from the client. Typically, it will be a subset, and step 608 also associates a PMR. If these are the first files received for this particular problem, a new transient-controlled debugging environment is then provisioned at step 610. The transient-controlled debugging environment is uniquely associated with the PMR and instantiated on-demand in a particular VM (or set of VMs). Preferably, the debugging environment is made ready before the PMR is assigned to a support engineer, although this is not a requirement. At step 612, the files are then pushed into the transient debugging environment where they are programmatically decrypted, preferably using the cipher that was stored at step 602. At step 614, a support engineer is assigned to the PMR. At step 616, secure debugging efforts are undertaken (and logged), but solely within the confines of the debugging environment, which itself it secured within the secure data center.

The concepts of qualification (to see the data) and "need-to-know" are not necessarily co-extensive. Thus, depending on implementation, it may be desired to add other security layers or restrictions to thereby provide additional levels of protection, e.g., only a PMR owner can log into the secure environment, only the PMR owner and their manager may log into the environment, or the like. Any degree of access granularity may be provided.

As has been described, access to the environment is limited to only those individuals who have been verified to have a need to access the environment to facilitate attempted resolution of the support issue. A permitted individual (e.g., a support analyst) can only work on the files within the transient debugging environment and until such time as the support work is complete. Preferably, all access is via an encrypted session between the analyst's workstation and the environment, with all activities within the environment logged. The analyst is restricted from removing data from the debugging environment including, without limitation, copying or pasting data to the base operating system of the analyst's machine, performing any file transfers out of the environment, or the like. Once the support work is complete (the PMR is closed), as indicated at step 618, the debugging environment (including, without limitation, any virtual machine (VM) created to support the environment) and the customer's data are discarded or destroyed. This is the "transient" nature of the debugging environment, which does not exist before the PMR is received (or re-opened), and which is destroyed or discarded once the PMR is closed.

As noted above, preferably only a trained, qualified, authenticated analyst with a need to know can access a particular secure debugging environment and the particular files that have been received therein. An appropriate access control mechanism (e.g., meta-LDAP-based) may be used to enable system analysts to prove their bona fides (e.g., skills, access rights, etc.) before being provided authority (by the system) to access a particular debugging environment to which they have been assigned.

Although not meant to be limiting, typically the VM is assigned to a PMR as opposed to a user. If PMR ownership changes, preferably the VM remains unaffected. If a new user then meets the specified criteria for access to the secure environment, he or she will be able to access the VM and thus see the data.

As noted above, in a preferred implementation, a secure debugging environment is generated on-demand in association with a PMR that itself is associated with a smallest (most-restricted) set of data that needs to be viewed by a support analyst. In other words, preferably only that sensitive data that needs to be viewed by the analyst is pushed into the debug environment. The PMR itself is associated with a dedicated virtual machine or machines that have associated therewith appropriate cryptographic materials (keys and certificates) to facilitate the on-demand decryption of the customer's sensitive data once it is received in the debugging environment. The use of the PMR nomenclature is not meant to be limiting, as the particular manner in which the support session is tracked is implementation-specific. Also, the term "support session" should not be taken as limiting, as the techniques herein may also be applied to other more generic situations, such as where confidential information is exchanged between business associates. More generally, the PMR is a support session identifier or a data record that includes identifying information for the particular secure support session (in which the customer's sensitive data is made available for viewing in the transient-controlled debugging environment).

The approach herein has many advantages. It provides highly-secure and protected access to a customer sensitive data, but only for so long as needed, and only by authenticated individuals. The approach provides for "just enough" access while also ensuring there is adequate dissemination control, as well as providing for logging necessary to ensure regulatory compliance. Programmatic enforcement of data encapsulation is enforced within the environment so that the customer's sensitive data remains accessible only within the environment. A debugging environment created "on-the-fly" in the manner described is highly-controlled, but it is also highly flexible in that it enables the support analyst to take advantage of the provider's support tools and processes (which remain local within the support data center environment). All access to the environment is strictly controlled and logged for reporting and other compliance purposes. A secure support session of this type preferably is only implemented upon the customer's specific request, and security is further enforced by managing the decryption keys that are used to decrypt the customer's sensitive data. Preferably, those keys are only used by code operating within a particular VM (tied to a PMR) and upon which the debugging environment is instantiated. Strict access controls are also placed on the system analysts to ensure that only those having a need to know the sensitive data are even permitted within the debugging environment.

The term "debugging environment" is not meant to imply that the techniques herein are limited solely to code development and debugging activities. More generally, the transient-controlled environment is one wherein a first party's sensitive data is received and made available to person(s) associated with a second party. Thus, the techniques herein may be used in any circumstance wherein it is desired to provide a secure environment for access to and limited/restricted use of the first party's sensitive data, all in the manner described above. An example scenario might be where the first party needs the ability to exchange information (e.g., that may include Protected Health Information (PHI)), with a second party partner in association with a general software support process. The second party may use a third party cloud provider. Using the approach herein, the second party may instantiate a secure environment in the manner described to facilitate the information exchange and support process. Another example scenario is one in which a first party desires to provide sensitive (confidential information) to a partner for review and analysis, but also wants to ensure a mechanism to track access to that information while in the partner's custody and control.

The approach herein thus may be used whenever it is desired to enable a support or other activity with a need to divulge sensitive information that is viewable only to appropriate (e.g., HIPAA-certified) individuals. Of course, the "qualification" to see the data may be established in any number of ways (e.g., authentication, completion of given training, existence of some attribute associated with the individual (e.g., U.S. citizenship, working in-country, etc.), a biometric, etc.)

The techniques described herein enable full lifecycle management of sensitive data, but in a manner that enables a permitted entity to access and view that data with appropriate safeguards.

While the use of a cloud environment for the support center is preferred, this is not a requirement, as the techniques herein may be implemented between any two endpoints connected over a network.

The particular cryptographic techniques that may be used for protecting the customer's sensitive data may be varied. As noted above, a same symmetric cipher may be used to encrypt the customer data prior to delivery to the secure data center, and to decrypt the sensitive data within the confines of the transient-controlled debugging environment. Other cryptographic techniques (e.g., asymmetric-based cryptosystems, digital signatures, etc.) may be enforced. As noted above, regardless of which ciphers are used, preferably programmatic enforcements of data encapsulation is enforced throughout the secure data center.

As noted, the functionality described above may be implemented as a standalone approach, e.g., a software-based function executed by a processor, or it may be available as a managed service (including as a web service via a REST or SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the described functions may be hosted within or external to the cloud.

Still more generally, the subject matter described herein can take the form of an entirely hardware embodiment, an entirely software embodiment or an embodiment containing both hardware and software elements. In a preferred embodiment, the functions of instantiating the transient-controlled debugging environments are implemented in software, which includes but is not limited to firmware, resident software, microcode, and the like. The customer data can be configured into a data structure (e.g., an array, a linked list, etc.) and stored in a data store, such as computer memory. Furthermore, as noted above, the functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item and is non-transitory.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques herein are implemented in a special purpose computer (or in one or more such computers), preferably in software executed by one or more processors. The software also is maintained in one or more data stores or memories associated with the one or more processors, and the software may be implemented as one or more computer programs.

The transient-controlled debugging environment instantiation function (and the environments themselves) referenced herein may be implemented as an adjunct or extension to an existing configuration management system or module, version management system or module, change management system or module, trouble ticket system or module, snippet management system or module, or the like. More generally, the described functionality may comprise a component of a software development environment solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

Having described our invention, what we now claim is as follows:

1. A method of managing sensitive data at a facility, comprising:
    following receipt of a request for a secure support session, receiving information, wherein at least a portion of the information is encrypted;
    associating the information with a data record uniquely associated with the secure support session;
    instantiating a transient secure computing environment associated with the data record, the transient secure computing environment being access-restricted;
    receiving the information in the transient secure computing environment;
    decrypting the information, wherein, upon decryption, the information is available for viewing and manipulation only within the transient secure computing environment; and
    upon close of the data record indicating that an operation associated with the information is complete, terminating the transient secure computing environment associated with the data record and deleting the information;
    wherein the instantiating step is carried out in software executing in a hardware element.

2. The method as described in claim 1 further including sorting data associated with the information to identify a subset of the information, wherein the information received in the transient secure computing environment is only the identified subset.

3. The method as described in claim 1 wherein the transient secure computing environment is instantiated in a virtual machine uniquely associated with the data record.

4. The method as described in claim 3 wherein the information is encrypted with a key, the virtual machine using the key to decrypt the information within the transient secure computing environment.

5. The method as described in claim 3 wherein terminating the transient secure computing environment terminates the virtual machine.

6. The method as described in claim 1 further including enabling access to the transient secure computing environment via a machine associated with an individual, the individual having been authenticated and having an established need to access the information within the transient secure computing environment.

7. The method as described in claim 1 wherein the data record is a Problem Management Report (PMR).

8. The method as described in claim 1 wherein the facility is associated with a first party, and the information is received from a second party, the first party having a need to access the information for a limited time period and for a limited purpose as determined by the second party.

9. Apparatus, comprising:
a processor;
computer memory holding computer program instructions that when executed by the processor perform a method of managing sensitive data, the method comprising:
following receipt of a request for a secure support session, receiving information, at least a portion of the information being encrypted;
associating the information with a data record uniquely associated with the secure support session;
instantiating a transient secure computing environment associated with the data record, the transient secure computing environment being access-restricted;
receiving the information in the transient secure computing environment;
decrypting the information, wherein, upon decryption, the information is available for viewing and manipulation only within the transient secure computing environment; and
upon close of the data record indicating that an operation associated with the information is complete, terminating the transient secure computing environment associated with the data record and deleting the information.

10. The apparatus as described in claim 9 wherein the method further includes sorting data associated with the information to identify a subset of the information, wherein the information received in the transient secure computing environment is only the identified subset.

11. The apparatus as described in claim 9 wherein the transient secure computing environment is instantiated in a virtual machine uniquely associated with the data record.

12. The apparatus as described in claim 11 wherein the information is encrypted with a key, the virtual machine using the key to decrypt the information within the transient secure computing environment.

13. The apparatus as described in claim 11 wherein terminating the transient secure computing environment terminates the virtual machine.

14. The apparatus as described in claim 9 wherein the method further includes enabling access to the transient secure computing environment via a machine associated with an individual, the individual having been authenticated and having an established need to access the information within the transient secure computing environment.

15. The apparatus as described in claim 9 wherein the data record is a Problem Management Report (PMR).

16. A computer program product in a non-transitory computer readable medium for use in a data processing system, the computer program product holding computer program instructions which, when executed by the data processing system, perform a method of managing sensitive data, the method comprising:
following receipt of a request for a secure support session, receiving information, at least a portion of the information being encrypted;
associating the information with a data record uniquely associated with the secure support session;
instantiating a transient secure computing environment associated with the data record, the transient secure computing environment being access-restricted;
receiving the information in the transient secure computing environment;
decrypting the information, wherein, upon decryption, the information is available for viewing and manipulation only within the transient secure computing environment; and
upon close of the data record indicating that an operation associated with the information is complete, terminating the transient secure computing environment associated with the data record and deleting the information.

17. The computer program product as described in claim 16 wherein the method further includes sorting data associated with the information to identify a subset of the information, wherein the information received in the transient secure computing environment is only the identified subset.

18. The computer program product as described in claim 16 wherein the transient secure computing environment is instantiated in a virtual machine uniquely associated with the data record.

19. The computer program product as described in claim 18 wherein the information is encrypted with a key, the virtual machine using the key to decrypt the information within the transient secure computing environment.

20. The computer program product as described in claim 18 wherein terminating the transient secure computing environment terminates the virtual machine.

21. The computer program product as described in claim 16 wherein the method further includes enabling access to the transient secure computing environment via a machine associated with an individual, the individual having been authenticated and having an established need to access the information within the transient secure computing environment.

22. The computer program product as described in claim 16 wherein the data record is a Problem Management Report (PMR).

* * * * *